April 23, 1963 — H. G. BOSER — 3,086,767
PLUMBER'S HELPER
Filed Sept. 4, 1959 — 2 Sheets-Sheet 1
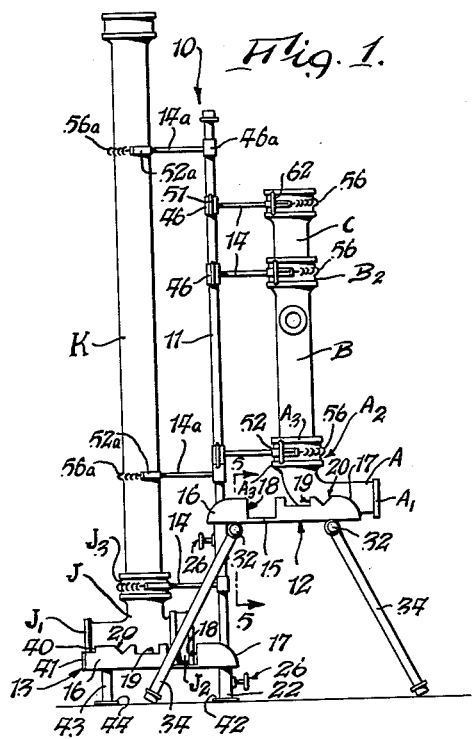
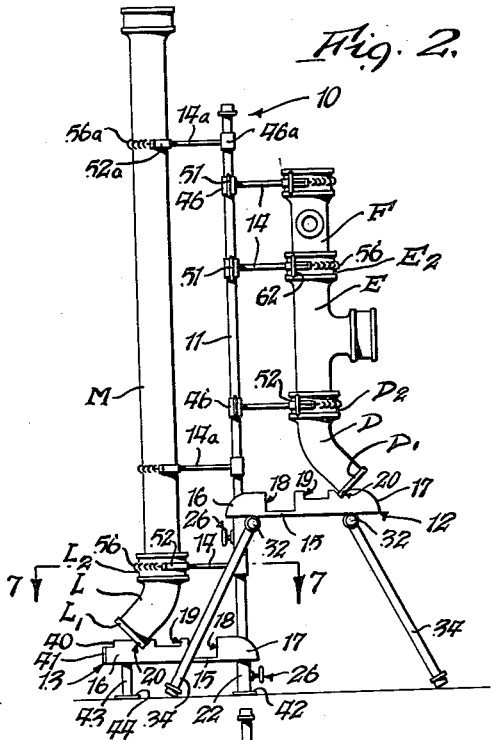
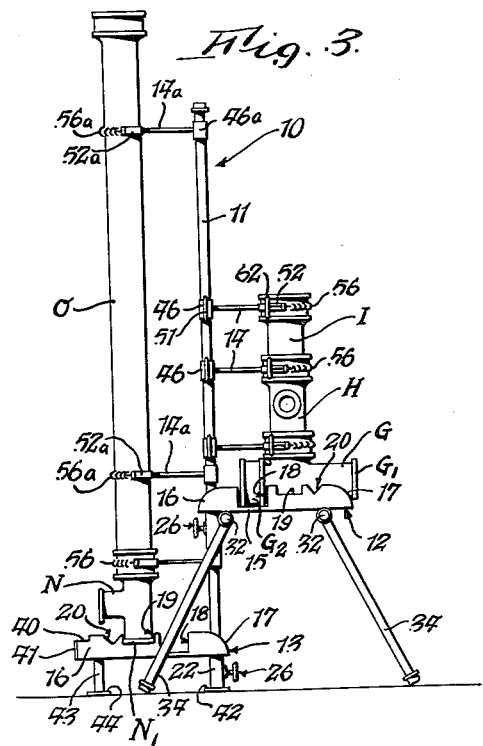
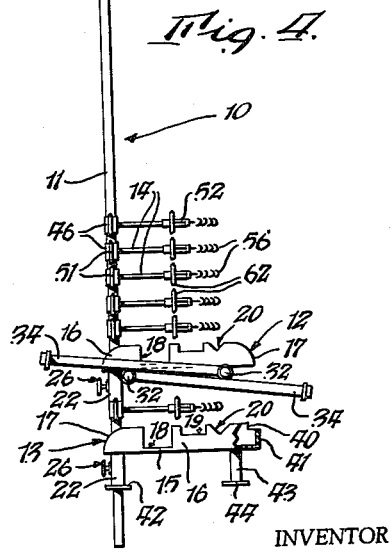
INVENTOR
Herman G. Boser
BY Popp and Sommer
ATTORNEY April 23, 1963  H. G. BOSER  3,086,767
PLUMBER'S HELPER Filed Sept. 4, 1959  2 Sheets-Sheet 2

INVENTOR
Herman G. Boser
BY Popp and Sommer
ATTORNEY

United States Patent Office 3,086,767
Patented Apr. 23, 1963

3,086,767
PLUMBER'S HELPER
Herman George Boser, 506 W. Main St., Arcade, N.Y.
Filed Sept. 4, 1959, Ser. No. 838,172
5 Claims. (Cl. 269—10)

This invention relates to improvements in implements for plumbers' use, and more particularly to a pipe supporting and clamping device hereinafter referred to as a plumber's helper.

The primary object of the invention is to provide a plumbers' helper which is adapted to support and clamp a variety of types of plumbing pipe sections, including elbows and T's, in the desired position to facilitate making up the joints between these and other pipe sections.

Another object of the invention is to provide a plumbers' helper which is not only easily set up on the job site but which is readily collapsible and portable from one job site to the other.

Another object of the invention is to provide a plumber's helper including a pipe supporting cradle especially adapted for supporting elbow and T pipe sections in a variety of positions.

Another object of the invention is to provide a plumber's helper including an arm having a releasable pipe clamp which can be readily opened or closed and which adjusts itself to the size of the pipe section or portion engaged thereby.

Other objects and advantages of the invention will become apparent upon consideration of the following detailed description and accompanying drawings wherein:

FIG. 1 is a side-elevational view of a plumber's helper embodying the invention and including an upright post, an upper right-hand pipe supporting cradle mounted on the post and provided with collapsible legs for supporting a 90° elbow pipe section, a lower left-hand pipe supporting cradle mounted on the post and supporting a T pipe section, and a plurality of arms mounted on the post at their inner ends and having releasable pipe clamps at their outer ends;

FIG. 2 is a side-elevational view similar to FIG. 1 but illustrating the plumber's helper when both the cradles are used to support a 45° elbow pipe section;

FIG. 3 is a view similar to FIGS. 1 and 2, but illustrating the upper right-hand cradle as supporting a T pipe section and the lower left-hand cradle as supporting endwise the male end of another T pipe section;

FIG. 4 is a side-elevational view illustrating the plumber's helper of FIGS. 1–3 in collapsed condition;

Figure 5:
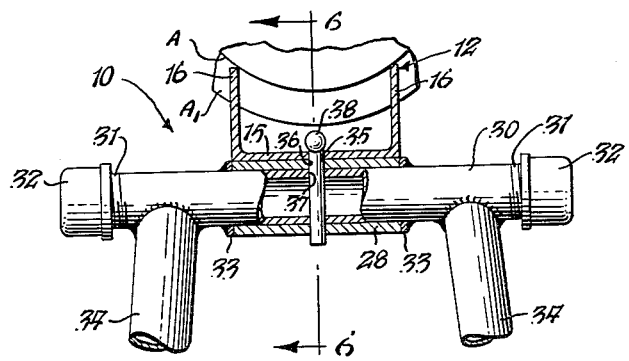
FIG. 5 is a sectional view taken on line 5—5 of FIG. 1 and illustrating the hinge connection between one pair of collapsible legs and the upper right-hand cradle together with the pin for locking these legs in extended or downwardly depending position.
Figure 6:
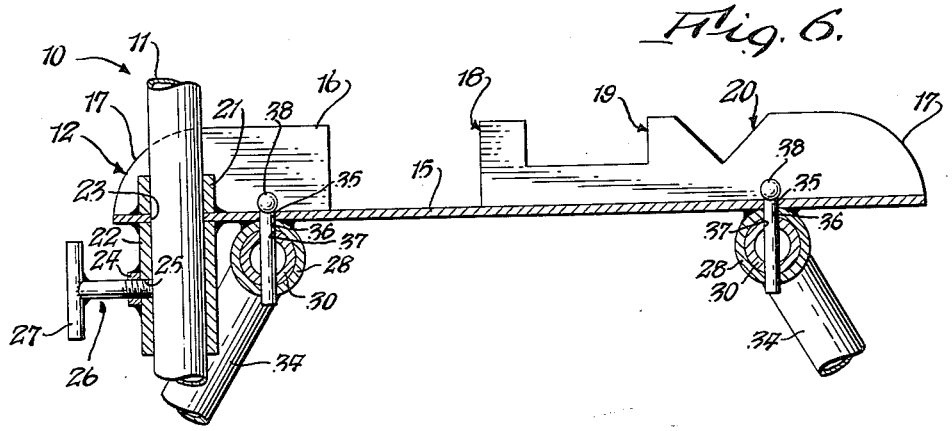
FIG. 6 is a sectional view taken on line 6—6 of FIG. 5 and illustrating the hinge connection between the collapsible legs and the cradle together with the pins for locking the legs in extended or downwardly depending position, as well as the sleeve-type mounting of the cradle on the post and the set screw for locking the sleeve thereon.

Referring to the drawings, and particularly FIGS. 1–3, the plumber's helper embodying this invention is generally indicated at 10 and preferably includes an upright post 11, an upper right-hand pipe supporting cradle 12, a lower left-hand pipe supporting cradle 13 and a plurality of pipe clamping arms 14, 14a. As also seen in FIGS. 5 and 6, the cradle 12 includes a web 15 and upstanding flanges 16 which are scalloped or rounded at each end as indicated at 17 to remove sharp corners, and the flanges are provided with longitudinally spaced pairs of substantially identical and transversely alined portions cut out from the upper longitudinal edges thereof. Reading from left to right, the first pair of cutout portions 18 are relatively deep, preferably extending to or almost to the web 15 and substantially rectangular in shape. The second pair of cut-out portions 19 are also substantially rectangular in shape but are relatively shallow as compared to the deeper cut-out portions 18. The third pair of cut-out portions 20 are substantially V-shaped. The particular functions of the aforesaid cut-out portions will be described more in detail below.

Referring particularly to FIG. 6, the web 15 is provided at its inner end with an upright hub 21 welded to its upper surface and a similar but longer depending hub 22 welded to its lower surface, as well as a bore 23 connecting these hubs. The lower hub 22 is provided with an internally threaded collar 24 welded to its outer periphery and a matching radial bore 25 receiving a set screw 26 provided with a handle 27. Together, hubs 21 and 22 and bore 23 in web 15 form a sleeve which fits over post 11 and mounts the inner end of the cradle on the post for sliding movement therealong and rotation thereabout. As will be apparent, the cradle can be located in any desired position by means of the set screw 26.

Continuing with FIGS. 5 and 6, the underside of web 15 is provided with a transverse sleeve 28 welded thereto adjacent each end. Slideably and rotatably mounted in sleeve 28 is a transverse connecting bar 30 preferably formed from ordinary piping having externally threaded ends 31 for receiving internally threaded caps 32. Connecting bar 30 is also provided with spacing washers 33 welded to its outer periphery and located adjacent the outer ends of transverse sleeve 28 to prevent shifting of the bar longitudinally in the sleeve. As will be apparent, the sleeve 28 on web 15 and the connecting bar 30 form a hinge connection between cradle 12 and each pair of legs 34 which are welded at their innermost ends to bar 30 on either side of the cradle. This hinge connection permits the pairs of legs 34 to rotate from an extended or downwardly depending and outwardly diverging position for supporting both ends of cradle 12 (as seen in FIGS. 1–3) to a collapsed position adjacent the cradle (as seen in FIG. 4). It is to be noted that in collapsing legs 34, the pair adjacent the inner end of the cradle are merely rotated counter-clockwise until they abut the connecting bar 30 adjacent the outer end of the cradle after the outer pair of legs 34 have been previously rotated counter-clockwise over the cradle until they rest on top of connecting bar 30 adjacent the inner end of the cradle.

In order to lock this hinge connection so that legs 34 will be retained in the extended position for supporting the ends of cradle 12, the web 15, transverse sleeves 28 and transverse connecting bars 30 are provided with vertically alined bores 35, 36 and 37 respectively for slideably receiving locking pins 38.

Referring to FIGS. 1–4, the lower left-hand cradle 13 will now be described in detail. As will be apparent, cradle 13 is quite similar to cradle 12, being provided with the deep rectangular cut-out portions 18, shallow rectangular cut-out portions 19 and V-shaped cut-out portions 20. However, instead of having its flanges 16 rounded or scalloped at each end, as is the case with cradle 12, the flanges of cradle 13 are scalloped only at their inner ends and are provided with a pair of substantially identical and transversely alined, relatively shallow and substantially L-shaped cut-out portions 40 extending to their outer ends. In addition, the outer end of cradle 13 is closed by means of an upstanding toe plate 41, the cut-out portions 40 actually extending to the top of this plate, as also seen in FIG. 4. At its inner end, cradle 13 is provided with the same sleeve-type mounting over post 11 and set screw locking device as shown in FIG. 6 for cradle 12. However, the lower hub 22 of this sleeve-type mounting is provided with an end flange 42 which is adapted to bear against the floor or ground. Unlike cradle 12, cradle 13 is not provided with collapsible supporting legs but rather a single vertical leg 43 depending downwardly from the underside of web 15 adjacent its outer end and terminating in a flange 44 similar to flange 42. Thus, the inner and outer ends of cradle 13 are supported by a single pair of relatively short, vertical legs. The function of cradle 13 will also be described more in detail below.

In view of the fact that the clamping arms 14, 14a employed by the plumber's helper 10 are substantially identical except for minor details to be referred to below, a description of a single arm 14 will suffice for all. As seen in FIGS. 1–4, these clamping arms are elongated and rotatably and slideably mounted at their inner ends on post 11, and are provided with releasable pipe clamps at their outer ends.

Figure 7:
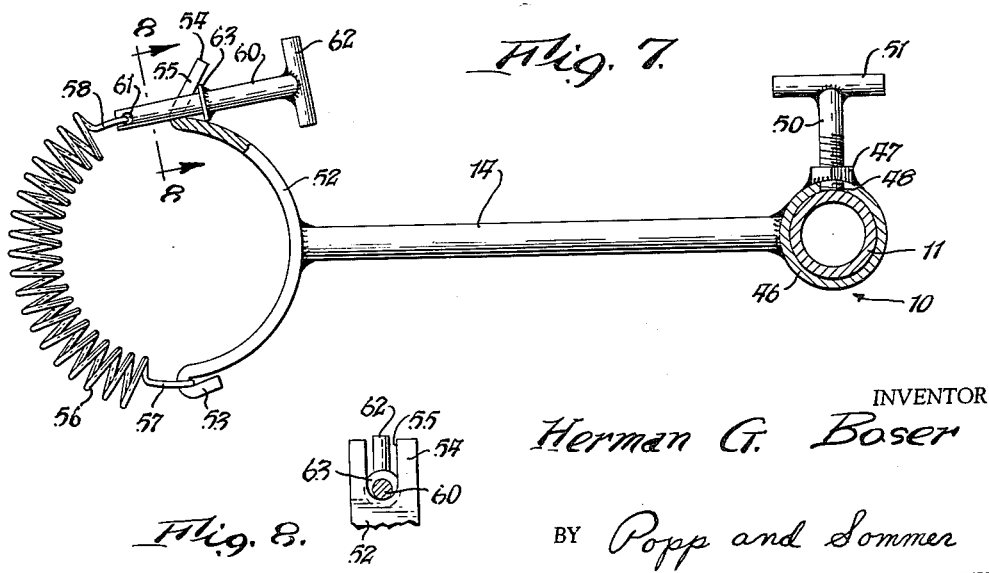
FIG. 7 is a sectional view taken on line 7—7 of FIG. 2 and illustrating an arm having a sleeve-type mounting on the post and a set screw for locking the sleeve thereon at one end and a yoke and coil spring type, releasable clamp.
Figure 8:
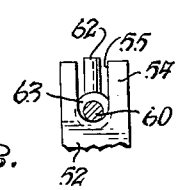
FIG. 8 is a partial sectional view taken on line 8—8 of FIG. 7 and illustrating the releasable connection between the yoke and spring portions of the clamp.

Referring to FIGS. 7 and 8, a pipe clamping arm 14 will now be described in detail. At its inner end, arm 14 is provided with a hollow sleeve 46 which is welded to the inner end of arm 14 and slideable over post 11. Sleeve 46 also has an internally threaded nut or collar 47 welded to its outer surface and a matching bore 48 for receiving an externally threaded set screw 50 provided with a handle 51. Just as with cradles 12 and 13, this sleeve-type mounting of arm 14 permits the arm to slide up and down on post 11 as well as to rotate thereabout, while the set screw is adapted to lock the arm on the post in any desired position.

Continuing with FIGS. 7 and 8, arm 14 is provided at its outer end with a releasable pipe clamp. This clamp is composed of a substantially semi-circular yoke 52 welded to the outer end of the arm. At one end, yoke 52 is bent back to form a hook 53 while the other end of yoke 52 is bent radially outwardly and slightly backwardly to form an outstanding tab 54. This tab is provided with an open end slot 55 of elongated substantially U-shape. Another principal element of the pipe clamp is a coil spring 56 having a hook 57 at one end inter-engaged with the hook 53 on yoke 52 and a hook 58 at its other end. The third principal element of the pipe clamp is locking bar 60 which is provided with a transverse bore 61 at one end for receiving hook 58 on spring 56, a handle 62 at its other end and a washer 63 welded to its outer periphery intermediate each end and forming an enlarged abutment or stop. As will be evident from FIG. 8, the locking bar 60 is adapted to pass through slot 55 in tab 54 while the washer 63 is adapted to engage both tab 54 and the outer surface of the yoke 52 adjacent thereto on the side of the tab remote from the hook 58 on spring 56.

Referring once again to FIGS. 1–3 of the drawings, the various functions of the cradles 12, 13 and the clamping arms 14, 14a associated therewith will now be described. As seen in FIG. 1 (as well as in FIG. 5), the upper right hand cradle 12 serves to support a 90° pipe elbow section A, the longer portion of which is inserted substantially parallel to web 15 of the cradle. In this connection, it will be noted that cradle 12 (and 13 as well) are of such transverse width that the pipe section does not actually contact the upper surface of the web but is actually suspended by the inner surfaces of flanges 16. This construction is preferred because it not only provides a firm support to prevent the pipe from moving laterally between the flanges, but also sufficient clearance above the web for the enlarged portions of the pipe sections, as clearly shown in FIGS. 1 and 3.

Continuing with FIG. 1, it will be noted that the length and positioning of cradle 12 and the corresponding clamping arms 14 are so adjusted that the male end or bead $A_1$ of the elbow pipe section A extends freely beyond the outer scalloped ends 17 of the flanges 16. Moreover, the flanges 16 rigidly support the elbow section A in order to locate its female end or bell $A_2$ in an upright position. In order to prevent the pipe section A from tilting or sliding horizontally in or out of cradle 12 the clamping arm 14 is located above the cradle, and the yoke 52 and coil spring 56 of the clamp 14 fit snugly around the female pipe end $A_2$ between its end flanges $A_3$.

As will also be apparent from FIGS. 7 and 8, it is a simple matter to stretch the spring 56 around this female end $A_2$, to insert the locking arm 60 into slot 5 in tab 54, whereupon the enlarged washer 63 on the arm readily engages the tab 54 upon releasing of handle 62. Furthermore, in view of the resilient nature of spring 56 the clamp is self-adjusting and readily accommodates itself to various sizes and shapes of the pipe sections or enlarged portions thereof, such as those illustrated.

At this point and as shown in FIG. 1, it is quite easy to insert the bead of the next succeeding pipe section B within the female end $A_2$ of elbow section A, as well as the bead of the top pipe section C in the corresponding bell $B_2$ of the pipe section B. Once again, the bells on each of sections B and C are readily clamped in place by additional arms 14.

Of course, the depending legs 34 on cradle 12 support both ends thereof at the desired height while the set screw 26 in sleeve 22 at the inner end of cradle 12 locks the cradle at the desired position. Similarly, the similar sleeve type mountings at the inner ends of the clamping arms 14 permit them to be slid up or down along the post 11 to the desired position and then locked in place by set screws 50 with their clamps positioned above the cradle 12 and around the bells of the various pipe sections.

As will now be evident, the cradle 12 and the clamping arms 14 associated therewith are primarily designed for making up a relatively short stack or feeder line complex. Once the various pipe sections making up the desired complex are supported and clamped in the desired position, it is but a simple matter to make up the joints therebetween with oakum and lead in the usual manner.

Referring to the right side of FIG. 2, the cradle 12 and its associated cradle arms 14 are designed to support and clamp a complex wherein the lowermost pipe section D is a 45° elbow as shown, the enlarged male end or bead $D_1$ thereof being inserted into and supported by the V-shaped cut-out portions 20 at an acute included angle to the web 15. Following the supporting and clamping of this section, a T section E may be inserted in the usual manner into the bell $D_2$ of the 45° section D with its bell $E_2$ clamped in place, and after which a shorter T section F may be inserted therein and also clamped in place.

Referring to the right side of FIG. 3, it will be seen that cradle 12 is now adapted to support a T-shaped pipe section G which is inserted between flanges 16 substantially parallel to web 15. When so used, the deep rectangular cut-out portions 18 are adapted to receive the bell $G_2$ of the T section G, while the bead $G_1$ at the other end of the section extends freely beyond the scalloped ends 17 of the cradle 12. Once again, the succeeding pipe sections H and I are inserted and clamped as above described to form the desired pipe complex.

Referring back to FIG. 1, it will be seen that the lower, left-hand cradle 13 is adapted to initially support a considerably longer stack of pipe complex, but the various cut-out portions in the flanges of the cradle permit it to support various types of pipe sections just as cradle 12. For example, and as shown in FIG. 1, cradle 13 is adapted to support a T-shaped pipe section J inserted between the flanges 16 substantially parallel to the web 15. In this instance the deep rectangular cut-out portions 18 receive the bell $J_2$ of the section J, while the L-shaped cut-out portions 40 at the outer end of the cradle 13 receive the opposite bead $J_1$ of section J, and at the same time, the upright toe plate 41 locates this bead $J_1$ in the desired position. The reason for having the L-shaped cut-out portion 40 and toe plate 41 is to provide additional support for the section J in order to prevent it from sliding or becoming dislodged longitudinally of cradle 13. This is particularly desirable in view of the increased weight and size of the relatively long and somewhat cumbersome pipe complex to be made up on the left-hand cradle 13.

Once the T section J has been properly located in the cradle 13, its upright bell $J_3$ is securely clamped by another arm 14 mounted on post 11. Following this, the long straight pipe section K is inserted into T section J, and clamped by the arms 14a, whereupon the joint can readily be made up in the usual manner. In this connection, it is to be noted that arms 14a are identical to arms 14 except that they are slightly longer and their yokes 52a and springs 56a are slightly smaller. The reason for this is that arms 14a are designed to clamp the long straight pipe sections intermediate their ends and not at their enlarged portions.

Referring to the left side of FIG. 2, it will be noted that cradle 13 is adapted to support a 45° elbow pipe section L, the bead $L_1$ of which is inserted into the V-shaped cut-out portions 20 of the flanges 16 in the same manner as in the right-hand cradle 12. The elongated straight pipe section M is then inserted into the bell $L_2$ of the elbow section L, the clamping of the sections and the making up of the joint therebetween being accomplished as described above.

Referring to the left side of FIG. 3, the lower cradle 13 is shown therein as utilizing the relatively shallow rectangular cut-out portions 19 to support the bead $N_1$ of a T section N inserted therein substantially perpendicular to the web 15 of the cradle. Following the clamping of the T section N the elongated section O is inserted therein and clamped by arms 14a, and the joint between the sections is made up, all as described above. While the upper right-hand cradle 12 is not illustrated in any of the figures as utilizing the shallow, rectangular cut-out portions 20, it is obvious that they would be used in the same manner as for the left-hand cradle 13.

As will now be apparent, the inventive helper can bet used to quickly and easily support and clamp a variety of types of pipe sections to facilitate the making up of a variety of types of plumbing complexes. In addition, the helper can readily be collapsed as shown in FIG. 4, and be carried from one job site to another without any difficulty. In collapsing the helper after the pipe complexes have been removed, the legs 34 of right-hand cradle 12 are collapsed as above described, following the removal of the locking pins 38. The left-hand cradle can then be unlocked from its position on the post 11 and rotated underneath and slid upwardly toward the right hand cradle 12 and once again locked in this position. In addition, each of the pipe clamping arms 14, 14a are adjusted to extend to the right side of the post 11 and grouped together adjacent the cradles 12 and 13, and finally locked in the position shown. This collapsed structure makes a most compact unit which can readily be carried in any suitable manner to the next job site.

It will now be seen how the invention accomplishes its various objects, and numerous advantages thereof will now be evident. While only certain preferred embodiments of the invention have been described and illustrated herein, it is to be understood that various changes and modifications may be made therein by those skilled in the art without departing from the spirit of the invention, the scope of which is to be determined by the accompanying claims.

What is claimed is:

1. In a plumber's helper, an elongated and substantially horizontal pipe supporting cradle of substantially channel-shaped cross section, said cradle including a web and upstanding flanges as a rigid unitary structure, said flanges having longitudinally spaced pairs of substantially identical and transversely alined portions cut-out from the upper longitudinal edges thereof, the inner surfaces of said flanges being adapted to support a pipe section inserted therebetween substantially parallel to said web, one of said pairs of cut-out portions being relatively deep and substantially rectangular and adapted to receive an enlarged female end portion of the same pipe section, and another of said pairs of cut-out portions being relatively shallow and substantially L-shaped and extending to one end of said cradle and being adapted to receive an enlarged male end portion of the same pipe section.

2. In a plumber's helper, an elongated and substantially horizontal pipe supporting cradle of substantially channel-shaped cross section, said cradle including a web, upstanding flanges and an upstanding toe plate as a rigid unitary structure, said flanges having longitudinally spaced pairs of substantially identical and transversely alined portions cut out from the upper longitudinal edges thereof, and said toe plate closing one end of said cradle, the inner surfaces of said flanges being adapted to support a pipe section inserted therebetween substantially parallel to said web, one of said pairs of cut-out portions being relatively deep and substantially rectangular and adapted to receive an enlarged female end portion of the same pipe section, another of said pairs of cut-out portions being relatively shallow and substantially L-shaped and extending to the top of said toe plate and being adapted to receive an enlarged male end portion of the same pipe section, and said toe plate being adapted to locate the outer end of said enlarged male end portion.

3. In a plumber's helper, an upright post, an outstanding, elongated and substantially horizontal pipe supporting cradle of substantially channel-shaped cross section mounted at its inner end on said post and including a web and upstanding flanges as a rigid unitary structure, and an outstanding arm adjustably mounted at its inner end above said cradle on said post for sliding movement therealong and rotation thereabout and having a releasable pipe clamp.

4. In a plumber's helper, an upright post, on outstanding, elongated and substantially horizontal pipe supporting cradle of substantially channel-shaped cross section adjustably mounted at its inner end on said post for sliding movement therealong and rotation thereabout and including a web and upstanding flanges as a rigid unitary structure and an outstanding arm mounted at its inner end on said post above said cradle and having a releasable pipe clamp at its outer end.

5. In a plumber's helper, an upright post, an outstanding, elongated and substantially horizontal pipe supporting cradle of substantially channel-shaped cross section adjustably mounted at its inner end on said post for sliding movement therealong and rotation thereabout and including a web and upstanding flanges as a rigid unitary structure, said flanges having substantially identical and transversely alined portions cut out from the upper longitudinal edges thereof, and an outstanding arm adjustably mounted at its inner end above said cradle on said post for sliding movement therealong and rotation thereabout and having a releasable pipe clamp at its outer end arranged above said flanges, said cut-out portions being adapted to receive an enlarged end portion of a pipe section and said clamp being adapted to receive another enlarged end portion of the same pipe section.

(References on following page)

References Cited in the file of this patent

UNITED STATES PATENTS

| | | |
|---|---|---|
| 552,951 | Bower et al. | Jan. 14, 1896 |
| 877,105 | Moore | Jan. 21, 1908 |
| 1,104,579 | Thorsby | July 21, 1914 |
| 1,519,018 | Boudreau | Dec. 9, 1924 |
| 1,709,928 | Whitney | Apr. 23, 1929 |
| 2,377,904 | Roach | June 12, 1945 |
| 2,400,512 | Hurtel | May 21, 1946 |
| 2,459,257 | Wood | Jan. 18, 1949 |
| 2,653,347 | Dieleman | Sept. 29, 1953 |
| 2,682,244 | Fortner | June 29, 1954 |
| 2,724,175 | Kjellberg | Nov. 22, 1955 |
| 2,774,134 | Smith et al. | Dec. 18, 1956 |
| 2,833,051 | Cunningham | May 6, 1958 |
| 2,853,771 | Melville | Sept. 30, 1958 |
| 2,854,941 | Vollmer | Oct. 7, 1958 |
| 2,863,203 | Dalpiaz | Dec. 9, 1958 |
| 2,883,184 | Brewington | Apr. 21, 1959 |
| 2,921,550 | Goodykoontz et al. | Jan. 19, 1960 |
| 2,968,978 | Wheeler | Jan. 24, 1961 |

FOREIGN PATENTS

| | | |
|---|---|---|
| 19,235 | Great Britain | of 1895 |
| 971,192 | France | June 28, 1950 |